US011921381B2

(12) United States Patent
Tanase

(10) Patent No.: US 11,921,381 B2
(45) Date of Patent: *Mar. 5, 2024

(54) DISPLAY DEVICE

(71) Applicant: Japan Display Inc., Tokyo (JP)

(72) Inventor: Kenji Tanase, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/120,157

(22) Filed: Mar. 10, 2023

(65) Prior Publication Data

US 2023/0213820 A1 Jul. 6, 2023

Related U.S. Application Data

(63) Continuation of application No. 17/479,193, filed on Sep. 20, 2021, now Pat. No. 11,624,954.

(30) Foreign Application Priority Data

Oct. 2, 2020 (JP) .................................. 2020-167864

(51) Int. Cl.
*G02F 1/1339* (2006.01)
*G02F 1/1343* (2006.01)
*G02F 1/1362* (2006.01)
*G02F 1/1335* (2006.01)
*G02F 1/1368* (2006.01)

(52) U.S. Cl.
CPC ...... *G02F 1/13394* (2013.01); *G02F 1/13396* (2021.01); *G02F 1/134318* (2021.01); *G02F 1/136209* (2013.01); *G02F 1/133519* (2021.01); *G02F 1/133553* (2013.01); *G02F 1/13439* (2013.01); *G02F 1/136245* (2021.01); *G02F 1/136286* (2013.01); *G02F 1/1368* (2013.01)

(58) Field of Classification Search
None
See application file for complete search history.

(56) References Cited

U.S. PATENT DOCUMENTS 8,817,220 B2 * 8/2014 Yokota ................. G09G 3/3648
349/149
2015/0198835 A1 * 7/2015 Kwon ................. G02F 1/13392
445/24
2016/0349562 A1 * 12/2016 Hashimoto ....... G02F 1/134309

FOREIGN PATENT DOCUMENTS

CN 101387794 A 3/2009
CN 103984158 A 8/2014
(Continued)

OTHER PUBLICATIONS

Office Action for CN Application No. 202111095042.4 dated Jun. 13, 2023. 8 pages.

*Primary Examiner* — Dung T Nguyen
(74) *Attorney, Agent, or Firm* — K&L Gates LLP

(57) ABSTRACT

A display device includes: a plurality of pixel electrodes arranged in the display region of a first substrate; a color filter provided on a second substrate opposing the first substrate and overlapping the pixel electrode; a planarization insulating layer provided on the color filter; a common electrode provided on the planarization insulating layer and having an opening; a spacer arranged between the pixel electrode and the common electrode; and a light-shielding layer provided between the first substrate and the pixel electrode and overlapping the spacer.

14 Claims, 16 Drawing Sheets

(56) References Cited

FOREIGN PATENT DOCUMENTS

CN 105116631 A 12/2015
JP 2010014988 A 1/2010

* cited by examiner

DISPLAY DEVICE

CROSS REFERENCE TO RELATED APPLICATIONS

This application is a continuation of U.S. patent application Ser. No. 17/479,193, filed on Sep. 20, 2021, which application is based upon and claims the benefit of priority from the prior Japanese Patent Application 2020-167864, filed on Oct. 2, 2020, the entire contents of which are incorporated herein by reference.

FIELD

An embodiment of the present invention relates to a display device.

BACKGROUND

One of the most widely used display devices at present is a liquid crystal display device. For example, a liquid crystal display device is widely used not only as a TV, but also as an interface for various electronic devices such as computers, tablets, and cellular phones. The liquid crystal display device can be broadly divided into a reflective liquid crystal display device and a transmissive liquid crystal display device. Japanese laid-open patent publication No. 2010-014988 and Japanese laid-open patent publication No. 2009-216978 disclose a liquid crystal display device.

SUMMARY

A display device according to one embodiment of the present invention includes a plurality of pixel electrodes arranged in a display region of a first substrate; a color filter provided on a second substrate opposing the first substrate and overlapping the pixel electrode; a planarization insulating layer provided on the color filter; a common electrode provided on the planarization insulating layer and having an opening; a first spacer arranged between the pixel electrode and the common electrode and overlapping the opening; and a first light-shielding layer provided between the first substrate and the pixel electrode and overlapping the first spacer.

DESCRIPTION OF EMBODIMENTS

Figure 1:
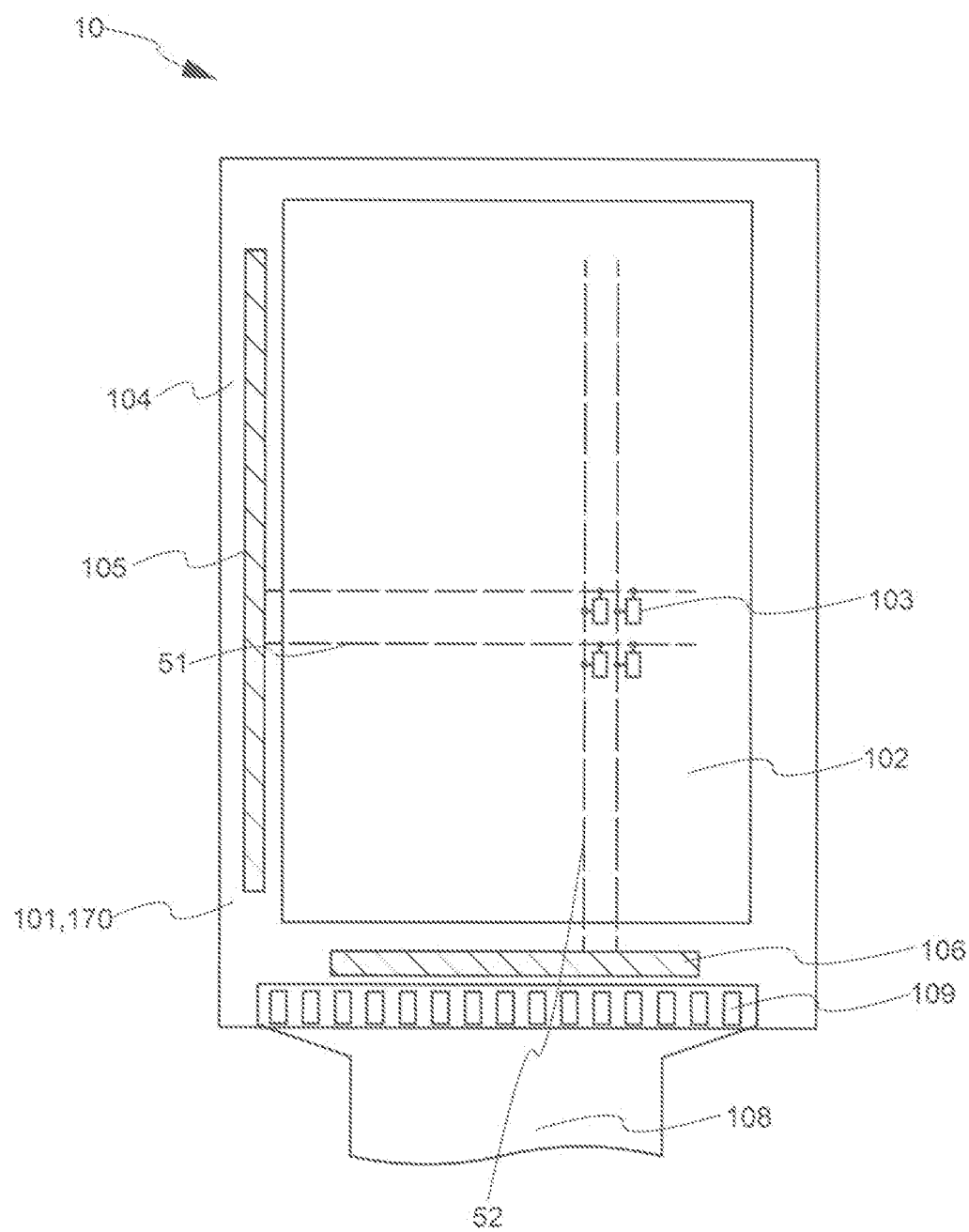
FIG. 1 is a top view showing a display device according to an embodiment of the present invention.

A reflective liquid crystal display device includes a liquid crystal display element driven by an electric field in a vertical direction. A liquid crystal layer in the liquid crystal display element is arranged between a first substrate on which a pixel electrode is provided and a second substrate on which a common electrode is arranged. In this case, since the liquid crystal layer is liquid, the liquid crystal layer is further provided with a spacer so that a distance (cell gap) is maintained between the two substrates. The spacer is arranged above the common electrode. A color filter formed of an organic film and a planarization layer exists between the common electrode and the second substrate.

When a physical load is applied to the liquid crystal display device, cracks or break may occur in the common electrode. In this case, degassing components in the organic film may enter the liquid crystal layer as bubbles from the crack or break. As a result, a display defect may occur in the liquid crystal display device.

In view of the above problems, it is an object of the present invention to provide a liquid crystal display element having excellent optical characteristics.

Embodiments of the present invention will be described below with reference to the drawings. However, the disclosure is merely an example, and those skilled in the art can easily conceive of appropriate changes while maintaining the gist of the invention and such changes are naturally included in the scope of the invention. For the sake of clarity of explanation, while the drawings may be schematically represented with respect to widths, thicknesses, shapes, and the like of the respective portions in comparison with actual embodiments, they are merely an example and do not limit the interpretation of the present invention.

In this specification and each of the drawings, the same reference numerals (or reference symbols denoted by A, B, and the like attached after a numeral) are given to the same elements as those described above with reference to the preceding drawings, and a detailed description thereof may be omitted as appropriate. In addition, the letters "first" and "second" attached to each element are convenient labels used to distinguish each element and have no further meaning unless otherwise stated.

Furthermore, in the detailed description of the present invention, in defining the positional relationship between one component and another, the terms "above" and "below" include not only the case of being positioned directly above or below one component, but also the case of including other components therebetween, unless otherwise specified.

First Embodiment (1-1. Configuration of Display Device)

FIG. 1 is a top view of a display device 10. The display device 10 has a substrate 101, a display region 102, a pixel 103, a peripheral region 104, a drive circuit 105, a drive circuit 106, a flexible printed circuit board 108, a terminal section 109, and a substrate 170. A plurality of pixels 103 is separately arranged in a matrix in the display region 102. The pixels 103 function as components of an image. Specifically, the pixel 103 contains a liquid crystal display element 130 to be described later. The liquid crystal display element 130 has a function of transmitting or blocking light. The peripheral region 104 is provided to surround the display region 102. The drive circuit 105 is provided in the peripheral region 104 and has a function as a gate driver. The drive circuit 106 is provided in the peripheral region 104 and has a function as a source driver. A scan line 51 is connected to the drive circuit 105. A signal line 52 is connected to the drive circuit 106. The pixel 103 is connected to the scan line 51 and the signal line 52. In the present embodiment, a memory-in pixel (MIP) is provided within the pixel 103. Details will be described later.

In the display device 10, a display control signal is input to the drive circuit 105 and the drive circuit 106 from an external control device (not shown) via the flexible printed circuit board 108. In this case, the scan signal from the drive circuit 105 is transmitted to the pixel 103 in the display region 102 via the scan line 51. Similarly, a video signal from the drive circuit 106 is transmitted to the pixel 103 in the display region 102 via the signal line 52. As a result, a still image and a moving image are displayed in the display region 102.

(1-2. Circuit Configuration of Pixel)

Figure 2:
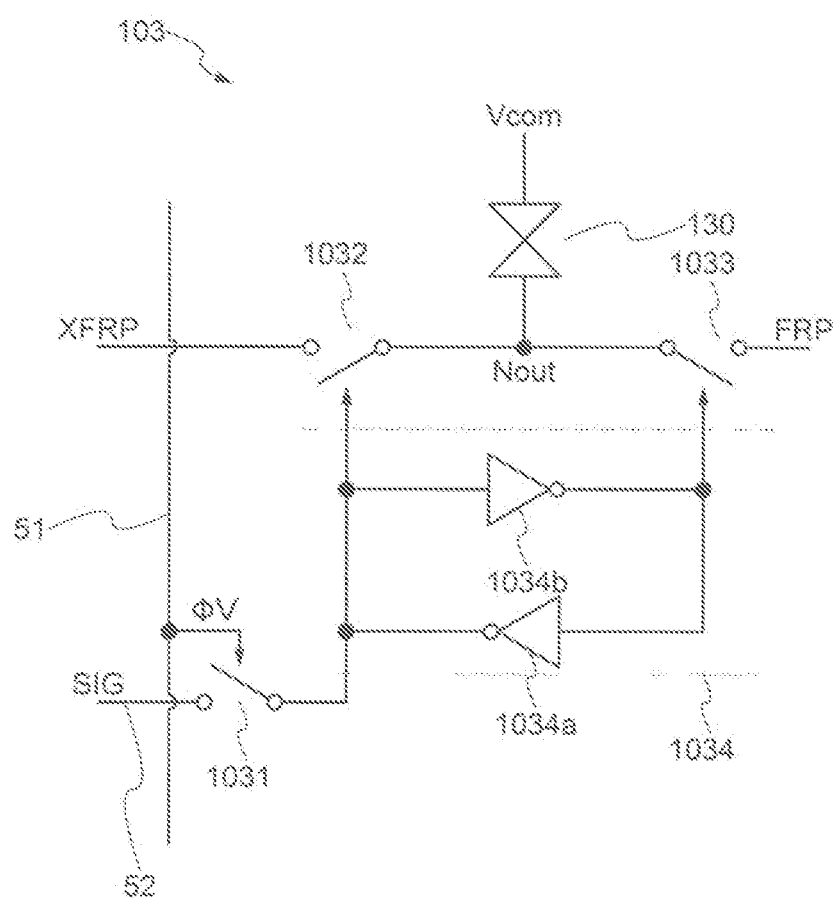
FIG. 2 is a circuit diagram showing an example of a circuit configuration of a pixel of a display device according to an embodiment of the present invention.

Next, details of the circuit configuration of the pixel 103 in this embodiment will be described. FIG. 2 is a block diagram showing an example of a circuit configuration of the pixel 103.

As shown in FIG. 2, the pixel 103 has a SRAM function pixel configuration having three switch elements 1031 to 1033, a latching unit 1034, and the liquid crystal display element 130 (liquid crystal cell). The liquid crystal display element 130 controls a liquid crystal capacitance generated between the pixel electrode and the common electrode arranged opposite to the pixel electrode.

The switch element 1031 has one end connected to the signal line 52. As a result, the switch element 1031 is turned on (closed) when a scan signal φV is applied from the scan line 51, and the switch element 1031 captures data SIG supplied via the signal line 52. The latching unit 1034 is composed of inverters 1034a and 1034b connected in parallel in opposite directions to each other. The latching unit 1034 holds (latches) the potential corresponding to the data SIG captured by the switch element 1031.

Either one of the switch elements 1032 and 1033 is turned on according to the polarity of the holding potential of the latching unit 1034. In this case, a control pulse FRP or a reverse-phase control pulse XFRP in phase with a common potential $V_{COM}$ is applied to the pixel electrode relative to the liquid crystal display element 130 to which the common potential $V_{COM}$ is applied to the common electrode. A node in which one terminal of the switch elements 1032 and 1033 is commonly connected is an output-node Nout of the pixel circuit.

When the holding potential of the latching unit 1034 has a negative polarity, the pixel potential of the liquid crystal display element 130 is in phase with the common potential $V_{COM}$. Therefore, no potential is generated between the pixel electrode and the common electrode, and liquid crystal molecules do not move from the initial orientation state. When the holding potential of the latching unit 1034 has a positive polarity, the pixel potential of the liquid crystal display element 130 has a phase opposite to that of the common potential $V_{COM}$. Therefore, a potential is generated between the pixel electrode and the common electrode, and the liquid crystal molecules rotate from the initial orientation state based on the potential.

When light is not permitted to pass through the pixel in the default orientation state, black is displayed in the initial orientation state. In this case, when the liquid crystal molecules are initially rotated from the initial orientation state as described above, light is transmitted. As a result, white is displayed in the pixel. "White is displayed" means that the pixel is turned on. When the pixel has a color filter, a color corresponding to the color filter is displayed. Such display control is referred to as "normally black". On the other hand, a configuration in which light is transmitted (white display) when the liquid crystal molecules are in the initial orientation state, and light is not transmitted (black display) when the liquid crystal molecules are moved from the initial orientation state can be used. Such display control is referred to as "normally white".

Figure 3:
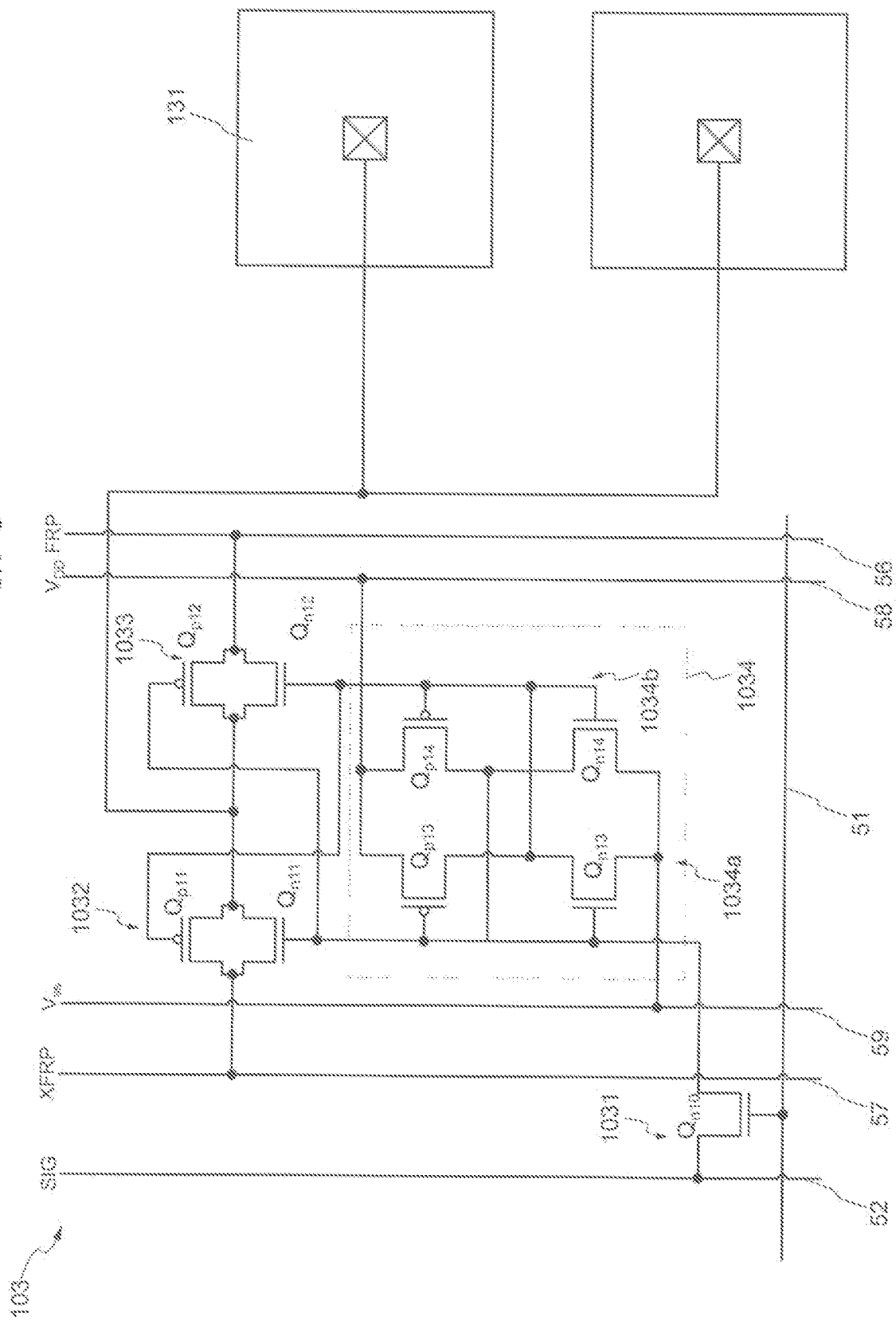
FIG. 3 is a circuit diagram showing an example of a circuit configuration of a pixel of a display device according to an embodiment of the present invention.

FIG. 3 is a circuit diagram showing an example of a specific circuit configuration of the pixel 103. In FIG. 3, portions corresponding to those in FIG. 2 are denoted by the same reference numerals. The circuit configuration shown in FIG. 3 may be referred to as a pixel circuit.

In FIG. 3, the switch element 1031 includes, for example, a NchMOS transistor $Q_{n10}$. The NchMOS transistor $Q_{n10}$ has a source/drain connected to the signal line 52 and a gate connected to the scan line 51.

Both of the switch elements 1032 and 1033 are composed of, for example, a transfer switch in which the NchMOS transistor and a PchMOS transistor are connected in parallel. Specifically, the switch element 1032 has a configuration in which a NchMOS transistor $Q_{n11}$ and a PchMOS transistor $Q_{p11}$ are connected in parallel with each other. The switch element 1033 has a configuration in which a NchMOS transistor $Q_{n12}$ and a PchMOS transistor $Q_{p12}$ are connected in parallel with each other.

Both the inverters 1034a and 1034b are composed of, for example, a CMOS inverter. Specifically, the inverter 1034a has a configuration in which the gates and drains of a NchMOS transistor $Q_{n13}$ and a PchMOS transistor $Q_{p13}$ are commonly connected to each other. The inverter 1034b has a configuration in which the gates and drains of a NchMOS transistor $Q_{n14}$ and a PchMOS transistor $Q_{p14}$ are commonly connected to each other.

The pixel 103 based on the above-described circuit configuration is expanded in the horizontal direction and the vertical direction and arranged in a matrix. In addition to the scan line 51 for each row and the signal line 52 for each column, control lines 56, 57 for transmitting control pulses FRP, XFRP, and power supply lines 58, 59 for a positive power supply voltage $V_{DD}$ and a negative power supply voltage $V_{SS}$ are wired for each column for this matrix arrangement of the pixel 103.

As described above, an MIP method and an active matrix type display device 10 according to the present embodiment has a configuration in which a pixel with the SRAM function (MIP) having the latching unit 1034 for holding the potential corresponding to display data is arranged in a matrix. In the present embodiment, an example in which the SRAM is used as a memory with a built-in pixel has been described. However, the SRAM is merely an example, and a memory having another configuration, for example, a DRAM may be used.

The display device 10 can realize a display in a memory display mode by having a memory in the pixel. In the memory display mode, since the pixel data held in the memory is used for the display, a writing operation of a signal potential reflecting the gradation does not need to be executed in a frame cycle. Therefore, it is possible to reduce the power consumption of the display device.

There is a need to partially rewrite a display screen, i.e., only a part of the display screen. In this case, the pixel data may be partially rewritten. When the display screen is partially rewritten, that is, the pixel data is partially rewritten, data need not be transferred for the pixels that are not rewritten. Therefore, since the data transfer amount can be reduced, power saving of the display device can be achieved.

As shown in FIG. 3, in the present embodiment, the pixel electrode in one pixel may be arranged by dividing into a plurality of pixels. In this case, the divided pixel electrode within one pixel may be referred to as a sub-pixel electrode. A plurality of such pixel circuits and a combination of a sub-pixel electrode connected to a pixel electrode may be arranged in one pixel. It is possible to perform gradation display at the pixel by combining turning on/turning off of the plurality of sub-pixel electrodes. In this case, the sub-pixel electrode may be connected via a relay wiring.

(1-3. Planar and Cross-Sectional Configuration of Display Region)

Figure 4:
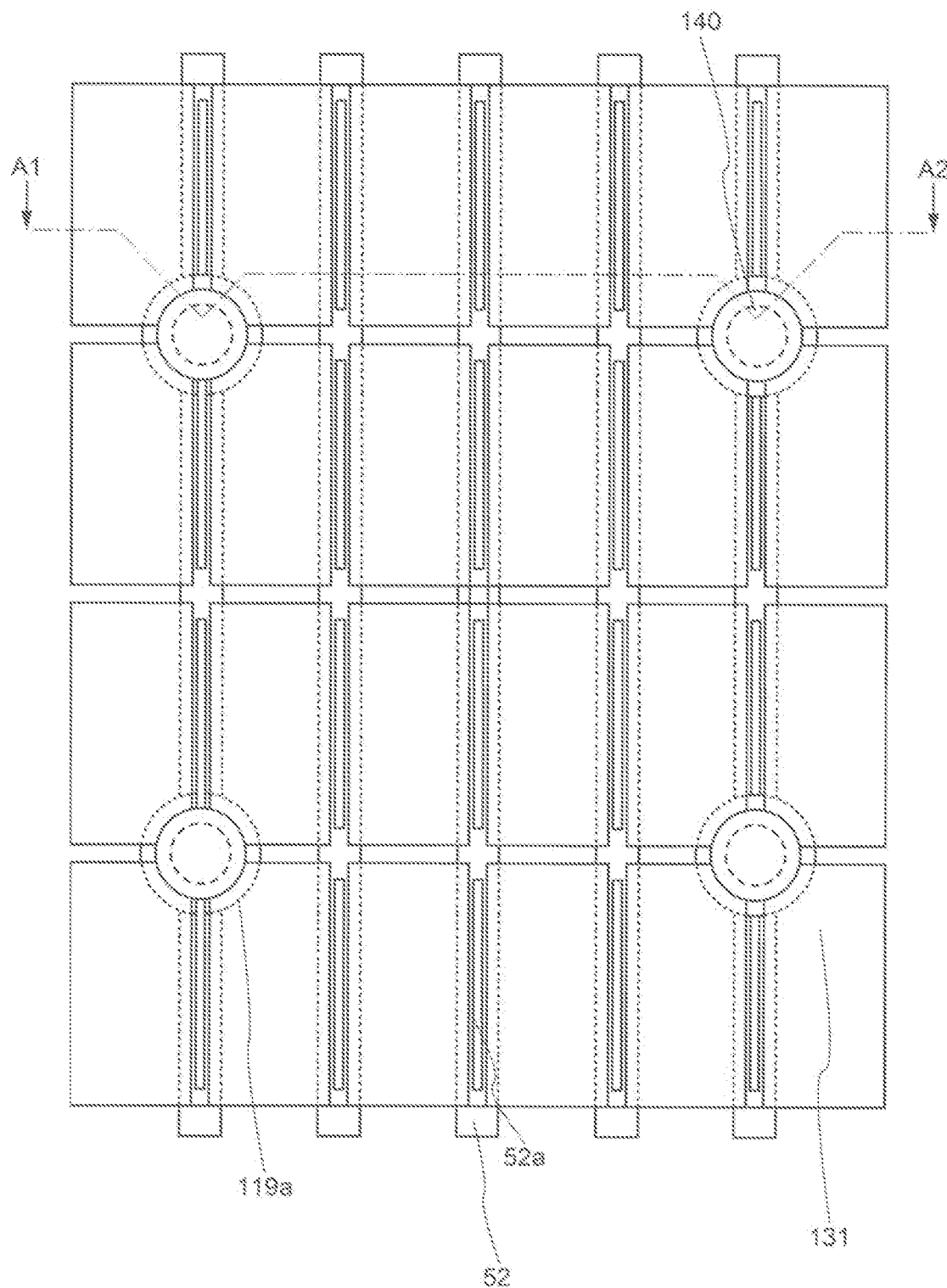
FIG. 4 is a plan view showing a part of a display region in a display device according to an embodiment of the present invention.
Figure 5:
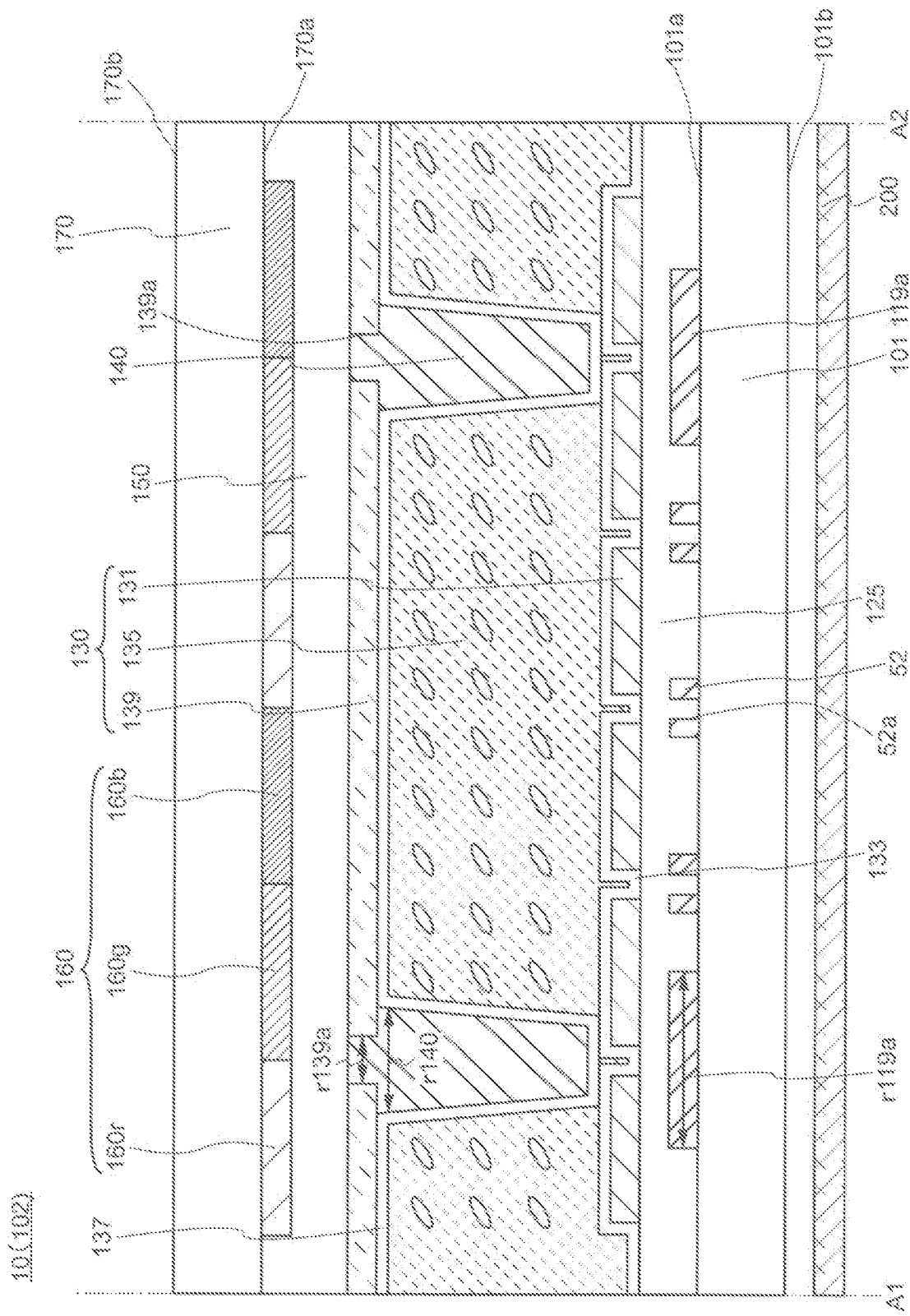
FIG. 5 is a cross-sectional view showing a display region in a display device according to an embodiment of the present invention.

FIG. 4 is an enlarged schematic plan view of a part of the display region. FIG. 5 is a cross-sectional schematic view showing a configuration between A1-A2 of FIG. 4. In FIG. 4 and FIG. 5, a part of the configuration is omitted for the sake of explanation. Detailed cross-sectional configurations will be described later.

As shown in FIGS. 4 and 5, the display device 10 includes the substrate 101, a light-shielding layer 119a, a planarization insulating layer 125, an alignment film 133, a spacer 140, the liquid crystal display element 130 (a pixel electrode 131, a liquid crystal layer 135, a common electrode 139), an alignment film 137, a planarization insulating layer 150, a color filter 160, and the substrate 170.

The substrate 101 and the substrate 170 are arranged to face each other. The substrate 101 and the substrate 170 have a function of transmitting light. For example, the substrate 101 and the substrate 170 may be made of an inorganic insulating material or an organic insulating material having light transmittance, or a mixed material of the inorganic insulating material and organic insulating material. Specifically, a glass substrate is used for the substrate 101 and the substrate 170. The substrate 101 and the substrate 170 preferably have a thickness sufficient to have rigidity. Specifically, the thickness of the substrate 101 and the substrate 170 is preferably 100 µm or more and 1000 µm or less.

Although an example in which the substrate 101 and the substrate 170 have rigidity is shown, the present invention is not limited thereto. For example, the substrate 101 and the substrate 170 may have flexibility. In this case, an organic resin material may be used for the substrate 101 and the substrate 170. Specifically, a polyimide resin may be used for the substrate 101 and the substrate 170.

Transistors, a capacity element and wiring, and the like are provided in the substrate 101. Details are described below. In the present embodiment, the substrate 101 is referred to as a first substrate, and the substrate 170 is referred to as a second substrate.

The pixel electrode 131, the liquid crystal layer 135, and the common electrode 139 are used for the liquid crystal display element 130. The liquid crystal display element 130 has the function of transmitting light to the substrate 170 or blocking light. In this embodiment, a plurality of pixel electrodes 131 provided in the substrate 101 is covered with the alignment film 133. Similarly, the common electrode 139 provided on the substrate 170 is covered with the alignment film 137.

The pixel electrode 131 is provided for each pixel 103 on the planarization insulating layer 125. That is, the pixel electrode 131 is arranged in the display region 102. The pixel electrode 131 functions as the first electrode of the liquid crystal display element 130. A reflective conductive material is used for the pixel electrode 131. For example, a metal material such as silver, copper, aluminum, titanium, and molybdenum is used for the pixel electrode 131. The pixel electrode 131 may be formed of a material having light transmittance and conductivity together with the above-mentioned material. For example, the pixel electrode 131 may be formed by stacking silver and ITO (Indium Tin Oxide). The pixel electrode here may be configured to include a plurality of sub-pixel electrodes as described above.

The color filter 160 is provided on the substrate 170 (specifically, on a first surface 170a side of the substrate 170). The color filter 160 overlaps the pixel electrode 131. The color filter 160 has a function of transmitting light in a specific wavelength band. For example, a material that transmits light in a red wavelength band (also referred to as a first wavelength band, specifically, a wavelength band of 610 nm to 750 nm) is used for a color filter 160r. A material that transmits light in a green wavelength band (also referred to as a second wavelength band, specifically, a wavelength band of 500 nm to 560 nm) is used for a color filter 160g. A material that transmits light in a blue wavelength band (specifically, a wavelength band of 435 nm to 480 nm) is used for a color filter 160b.

In this embodiment, the respective color filters 160 (the color filter 160r, the color filter 160g, and the color filter 160b) are in contact with each other on the side surface. In other words, there is no light shielding between the substrate 170 and each of the color filters 160. Although the color filter 160r, the color filter 160g, and the color filter 160b are exemplified in contact with each other on the side surface, they may be arranged separated with an interval. A configuration in which end portions of the adjacent color filter 160r, the color filter 160g, and the color filter 160b partially overlap each other may also be used.

The planarization insulating layer 150 is provided on the color filter 160. A colorless transparent organic material or a composite material of a colorless transparent organic material and an inorganic material is used for the planarization insulating layer 150 (also referred to as an overcoat layer). For example, an acrylic resin is used for the planarization insulating layer 150.

The common electrode 139 is provided on the planarization insulating layer 150. The common electrode 139 functions as a second electrode of the liquid crystal display element 130. In FIG. 4, the common electrode 139 is provided at least over the display region 102 and opposed to all the pixel electrode 131 and between the pixel electrode 131, as will be briefly described in detail below. Alternatively, the common electrode may be patterned into multiple parts in the display region 102 and opposed to the plurality of pixel electrodes 131. The common electrode 139 is formed of a material having light transmittance and conductivity. For example, an oxide conductive material such as ITO or IZO (Indium Zinc Oxide) is used for the common electrode 139.

The common electrode 139 has an opening 139a between four adjacent pixel electrodes 131.

In the liquid crystal layer 135, a plurality of spacers 140 is provided between the pixel electrode 131 and the common electrode 139. The spacer 140 has the function of retaining a distance between the pixel electrode 131 and the common electrode 139, that is, an interval between the substrate 101 and the substrate 170. An inorganic material or an organic material is used for the spacer 140. In this example, a photo spacer formed of a photosensitive resin is used as the spacer 140. The spacer 140 overlaps a part of at least two pixel electrodes 131 arranged adjacent to each other among the plurality of pixel electrodes 131. In this example, the spacer 140 overlaps a part of the four adjacently arranged pixel electrodes 131. In this embodiment, the substrate 170, the color filter 160, the common electrode 139, and the spacer 140 are collectively referred to as a color filter substrate.

The liquid crystal layer 135 is arranged between the pixel electrode 131 and the common electrode 139. In other words, the liquid crystal layer 135 is provided between the substrate 101 and the substrate 170. The liquid crystal layer 135 may be formed of any suitable liquid crystal material. In this embodiment, a TN (Twist Nematic) liquid crystal element, and a VA (Vertical Alignment) liquid crystal element are used as the liquid crystal display element 130.

The light-shielding layer 119a is provided between the substrate 101 and the pixel electrode 131. The light-shielding layer 119a overlaps the spacer 140 in the normal direction of the substrate 101. In this case, a diameter r140 of the spacer 140 is desirably smaller than a diameter r119a of the light-shielding layer 119a. A black resin material or a reflective metal material is provided for the light-shielding layer 119a. In this embodiment, a reflective metal material is used for the light-shielding layer 119a. The light-shielding layer 119a is provided in the same layers as the signal line 52 and a source/drain electrode 119b described later. As shown in FIG. 4, in this embodiment, the light-shielding layer 119b is formed integrally with the signal line 52. That is, although the signal line 52 is formed to have a predetermined thickness, a portion corresponding to the light-shielding layer 119a is formed to bulge further outward in a convex arc shape than the predetermined thickness.

In the display device 10 of this embodiment, light incident from the substrate 170 side (specifically, a second surface 170b side of the substrate 170) is reflected by the pixel electrode 131. Then, the light reflected by the pixel electrode 131 is emitted from the substrate 170 side through the liquid crystal layer 135, the common electrode 139, and the color filter 160. That is, the display device 10 is a reflective liquid crystal display device. In this case, no light shielding material is provided between the color filters 160r, 160g, and 160b. Thus, the display device 10 can improve reflective optical characteristics.

In this embodiment, since the pixel electrode 131 is formed of a reflective metal material, it is possible to arrange the pixel circuit on the lower side of the pixel electrode 131 (substrate 101 side).

In this embodiment, a lighting device 200 is provided on the lower side of the substrate 101 shown in FIG. 5, and light may be transmitted through a gap (for example, 3 μm or more and 10 μm or less) between the pixel electrodes 131. Thus, it is possible to improve the optical characteristics of the display device. When the signal line 52, which is the same layer as the light-shielding layer 119a, overlaps the gap between the pixel electrodes 131, an opening 52a may be provided in a part of the signal line 52, as shown in FIGS. 4 and 5. The opening 52a is formed as an elongated slit extending along the extending direction of the signal line 52. One longitudinal edge of the opening 52a constitutes a part of the outer edge of a light-shielding portion. A configuration in which a pair of long side edges of the opening 52a coincide in a plan view of the pixel electrode 131 can also be used. As a result, a slit is formed between the adjacent pixel electrodes 131, and the optical transparency of the portion is improved. Although not shown, when the scan line 51 overlaps the gap between the pixel electrodes 131, an opening may be provided in a part of the scan lines 51 similar to the signal line 52.

In this embodiment, the common electrode 139 has the opening 139a. As a result, the spacer 140 and the planarization insulating layer 150 can be in contact with each other. Since both the spacer 140 and the planarization insulating layer 150 contain an organic resin, the adhesion (adhesiveness) of the spacer to the substrate is enhanced. This suppresses structural changes of the spacer 140 such as inclination of the spacer 140.

In this embodiment, a diameter r139a of the opening 139a in the common electrode 139 is desirably smaller than the diameter r140 of the lower side in the spacer 140.

(1-4. Method for Manufacturing Display Device)

Next, a method for manufacturing the display device 10 will be described with reference to the drawings. In this embodiment, for the sake of explanation, the method for manufacturing the color filter substrate (up to forming the spacer 140 on the substrate 170) used in the display device 10 will be described.

Figure 6:
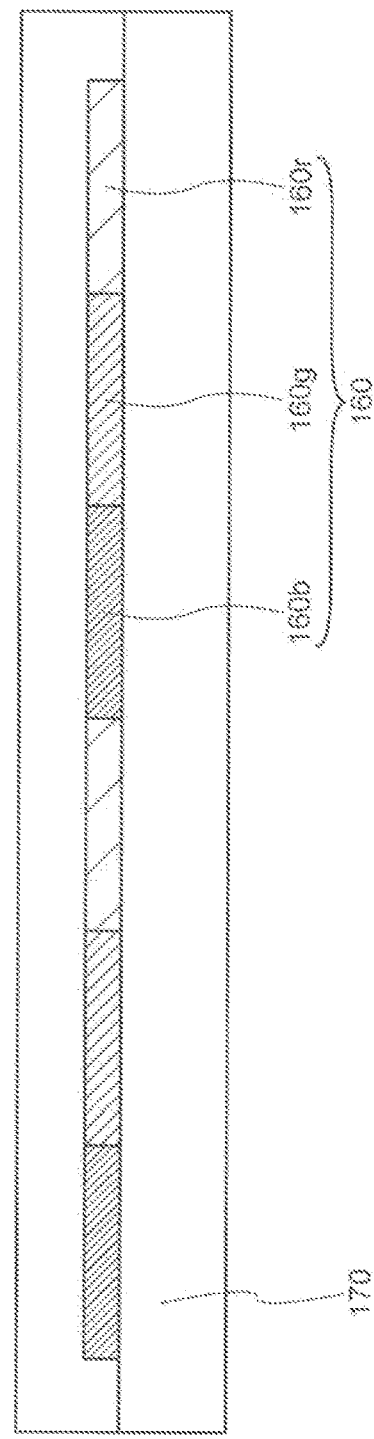
FIG. 6 is a cross-sectional view showing a method for manufacturing a display device according to an embodiment of the present invention.

As shown in FIG. 6, the color filter 160 is formed on the substrate 170. First, the red color filter 160r is formed on the substrate 170. In this case, the red color filter 160r is coated and formed on the entire top surface of the substrate 170 by a slit coat method, and then processed to be arranged at a predetermined position by a photolithography method. The thickness of the red color filter 160r is 0.5 μm or more and 10 μm or less, preferably 0.5 μm or more and 3 μm or less. In this example, the thickness of the red color filter 160r is 1 μm.

Next, the green color filter 160g is formed on the substrate 170. In this case, the green color filter 160g is coated and formed on the substrate 170 and the red color filter 160r by the slit coat method, and then processed to be arranged at a position different from the red color filter 160r by the photolithography method. In this case, the red color filter 160r and the green color filter 160g may be in contact with each other on the side surface.

Next, the blue color filter 160b is formed on the substrate 170. In this case, the blue color filter 160b is coated and formed on the substrate 170, the red color filter 160r, and the green color filter 160g by the slit coat method, and then processed to be arranged at a position different from the red color filter 160r and the green color filter 160g by the photolithography method. The blue color filter 160r may be in contact with the red color filter 160r and the green color filter 160g on the side surface.

Next, the planarization insulating layer 150 is formed on the substrate 170 and the color filter 160. The planarization insulating layer 150 is formed of an acrylic resin, an epoxy resin, a polyimide resin, or the like. The planarization insulating layer 150 is formed by a coating method, specifically the slit coat method. The thickness of the planarization insulating layer 150 is 0.5 µm or more and 10 µm or less, preferably 1 µm or more and 3 µm or less.

Figure 7:
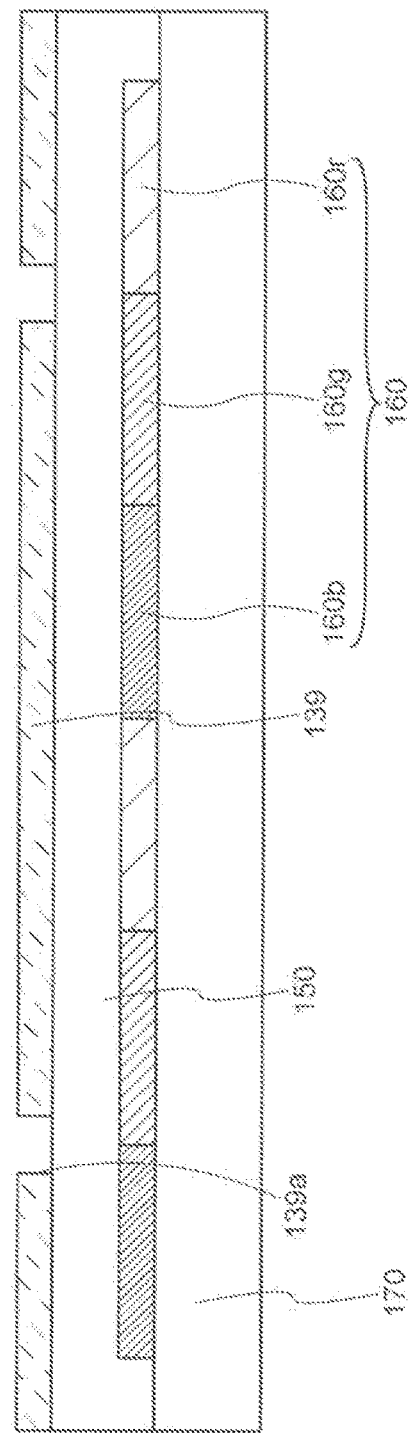
FIG. 7 is a cross-sectional view showing a method for manufacturing a display device according to an embodiment of the present invention.

As shown in FIG. 7, the common electrode 139 is formed on the planarization insulating layer 150. The common electrode 139 is formed of an oxide conductive material such as ITO or IZO. The common electrode 139 is formed by a sputtering method or an evaporation method. The thickness of the common electrode 139 is 0.05 µm or more and 1 µm or less, preferably 0.05 µm or more and 0.5 µm or less.

Next, the opening 139a is formed on the common electrode 139. The opening 139a is formed by a photolithography method and an etching method. The opening 139a is formed to overlap the boundary region between the respective color filters of the color filter 160. The opening 139a is formed at a position overlapping the light-shielding layer 119a on the substrate 101.

Figure 8:
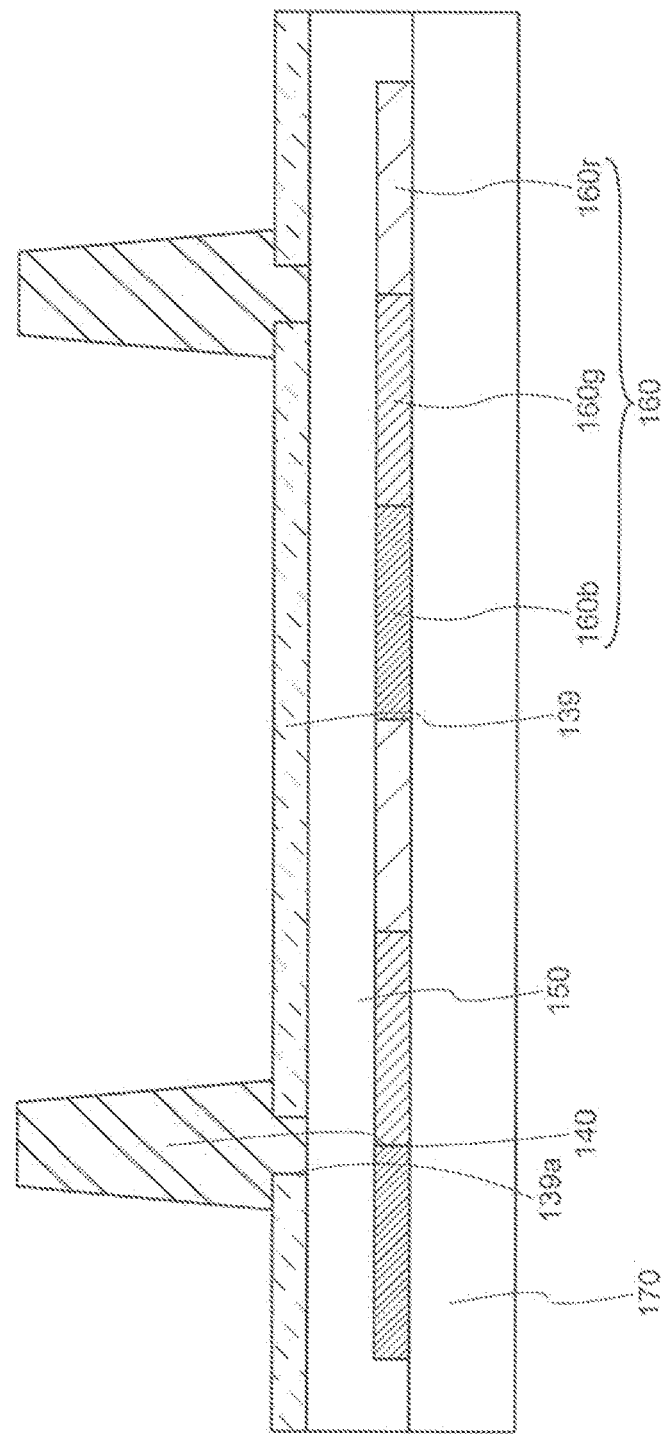
FIG. 8 is a cross-sectional view showing a method for manufacturing a display device according to an embodiment of the present invention.

As shown in FIG. 8, the spacer 140 is formed on the common electrode 139 and the planarization insulating layer 150. The spacer 140 is formed as an organic resin layer on the common electrode 139 by a coating method, and then processed into a predetermined shape by photolithography. In this case, the spacer 140 is formed to overlap the opening 139a. Thus, the spacer 140 and the planarization insulating layer 150 can be in contact. As a result, the adhesion of the spacer 140 on the substrate 170 side can be improved.

In the present embodiment, by forming the opening 139a, even after the common electrode is formed, gases generated from the planarization insulating layer 150 and the color filter 160 containing organic resins can be discharged from the opening 139a as appropriate. Therefore, degassing of the organic film described above in the manufacturing process is accelerated, and it is possible to suppress the occurrence of display defects due to degassing that occurs after manufacturing.

(1-5. Other Configurations of Display Device)

Figure 9:
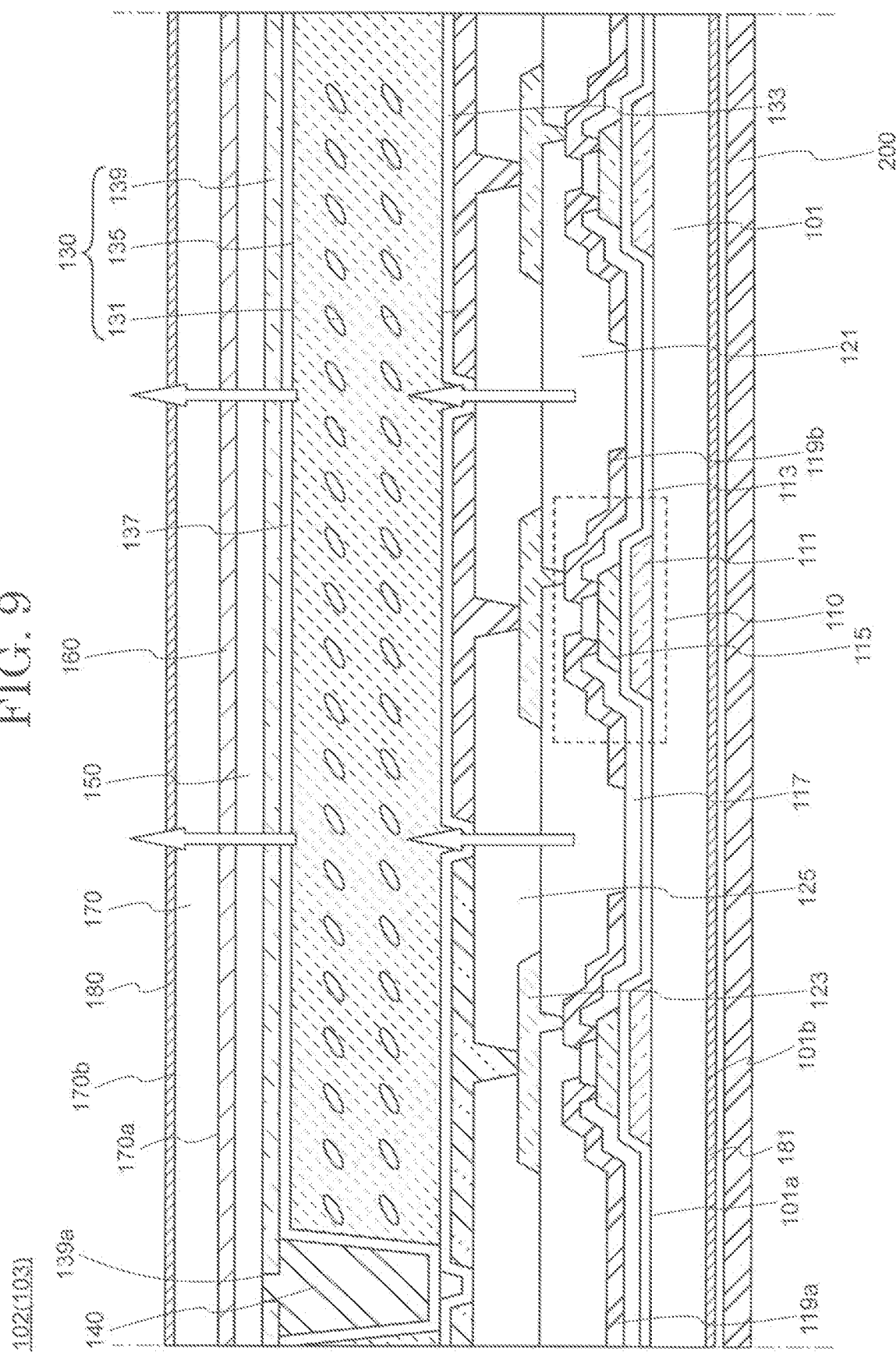
FIG. 9 is a cross-sectional view showing a display region in a display device according to an embodiment of the present invention.

Next, another configuration of the display device 10 will be described in detail with reference to a cross-sectional view. FIG. 9 shows a cross-sectional view of the display device 10, particularly the pixel 103 part of the display region 102. As shown in FIG. 9, in the pixel 103, the display device 10 includes a transistor 110, an insulating layer 117, a planarization insulating layer 121, a conductive layer 123, the planarization insulating layer 125, a polarizer 180, and a polarizer 181 in addition to the substrate 101, the liquid crystal conductive layer 130 (the pixel electrode 131, the liquid crystal layer 135, the common electrode 139), the spacer 140, the planarization insulating layer 150, the color filter 160, the light-shielding layer 119a, and the substrate 170.

The transistor 110 has a gate electrode 111, a gate insulating layer 113, a semiconductor layer 115, and the source/drain electrode 119b. The transistor 110 has a bottom-gate and top-contact structure. However, the present invention is not limited thereto, and the transistor 110 may have a top-gate and top-contact structure or a bottom-contact structure.

Although not shown, the capacity element may be constructed using the gate insulating layer 113 as a dielectric, or capacitance electrode provided on the same layer as a source or drain region of the semiconductor layer 115, and the gate electrode 111.

The gate electrode 111 is provided on the substrate 101 (specifically, on the first surface 101a side of the substrate 101). The gate electrode 111 is connected to the scan line 51 as appropriate. The gate electrode 111 may be formed of a single layer, or stacked layers or an alloy of a conductive material selected from silver, copper, tantalum, tungsten, titanium, molybdenum, aluminum, or the like. An insulating layer may be provided between the substrate 101 and the gate electrode 111.

The gate insulating layer 113 is provided on the gate electrode 111. The gate insulating layer 113 may be formed of silicon oxide, silicon oxynitride, silicon nitride, or other high dielectric constant inorganic materials. The gate insulating layer 113 may be a single layer or a stacked structure of the above materials.

The semiconductor layer 115 is provided on the gate insulating layer 113. Silicon, an oxide semiconductor or an organic semiconductor, and the like may be used for the semiconductor layer 115.

The insulating layer 117 is provided on the gate insulating layer 113 and the semiconductor layer 115. The insulating layer 117 is formed of a material similar to the gate insulating layer 113. The insulating layer 117 may be a single layer or a stacked layer.

The source/drain electrode 119b is provided on the insulating layer 117. The source/drain electrode 119b is appropriately connected to the signal line 52. The source/drain electrode 119b and the signal line 52 are formed of the same materials as those given as examples of the material of the gate electrode 111. In this case, the source/drain electrode 119b may be formed of the same material as the gate electrode 111, or may be formed of a different material.

The planarization insulating layer 121 has the function of planarizing steps and is provided on the insulating layer 117 and the source/drain electrode 119b. The planarization insulating layer 121 contains an organic resin. In this embodiment, an acrylic resin is used for the planarization insulating layer 121. The planarization insulating layer 121 is not limited to the acrylic resin, and may be formed of an epoxy resin, a polyimide resin, a polyamide resin, a polystyrene resin, a polyethylene resin, and a polyethylene terephthalate resin or the like. Alternatively, the planarization insulating layer 121 may be formed by stacking an organic resin and an inorganic material.

The conductive layer 123 is provided on the planarization insulating layer 121. The conductive layer 123 functions as the relay wiring to connect the transistors. A conductive material is used for the conductive layer 123. For example, the conductive layer 123 is formed of a material similar to the gate electrode 111. In addition to the conductive layer 123, although not specifically shown, other wirings bonded with the aforementioned source/drain electrode 119b may also be formed using the same conductive material.

The planarization insulating layer 125 has the function of planarizing steps. The planarization insulating layer 125 is provided on the planarization insulating layer 121 and the conductive layer 123. The planarization insulating layer 125 may be formed of a material similar to the planarization insulating layer 121.

The polarizer 181 is provided on a second surface 101b on the outside of the substrate 101. The polarizer 180 is provided on the second surface 170b on the outside (visible side) in the substrate 170. Configurations without the polarizer 181 may also be used.

In this embodiment, two planarization insulating layers are stacked on the substrate 101 (the planarization insulating layer 121 and the planarization insulating layer 125 are stacked). Then, the conductive layer 123 is provided between the planarization insulating layer 121 and the planarization insulating layer 125. The conductive layer 123 electrically connects the pixel electrodes 131 separately provided on the planarization insulating layer 125.

In the present embodiment, it is possible to reduce the film thickness of the planarization insulating layer 125 directly below the pixel electrode as compared with the case of providing one planarization insulating layer. Thus, the diameter of a contact hole provided for electrically connecting the planarization insulating layer 125 to the pixel electrode 131 can be reduced as compared with the one-layer planarization insulating layer. Thus, the pixel size can be reduced. Therefore, it is possible to improve the resolution of the display device.

In this embodiment, a metal wiring (the conductive layer 123) connecting the plurality of pixel electrodes 131 is provided between the two planarization insulating layers. Therefore, in the reflective liquid crystal display device, it is possible to suppress a decrease in a display-effective area (reflection area) as compared with the case where a connection wiring is provided in the same plane as the pixel electrode 131.

The display device 10 includes a lighting device 200 provided on the lower side of the second surface 101b of the substrate 101. Light emitted from the lighting device 200 passes through the pixel electrode 131, is transmitted through the liquid crystal display element 130, and is emitted from the second surface 170b of the substrate 170. As a result, the display device 10 can utilize the transmitted light together with the reflected light, and it is possible to improve a luminance of the display screen.

As described above, in a configuration in which the lighting device 200 is provided below the display device 10, as shown in FIG. 5, since the diameter r140 of the spacer 140 is smaller than the diameter r119a of the light-shielding layer 119a, the spacer 140 and the periphery of the spacer 140 are shielded from light by the light-shielding layer 119a. Thus, the passage of light from the lighting device 200 to the spacer 140 and a portion where orientation disturbance is likely to occur in the vicinity thereof is suppressed. As a result, a decrease in contrast is suppressed.

Second Embodiment

In this embodiment, a display device different from the first embodiment will be described. Specifically, an example in which spacers having different functions and heights are arranged will be described.

Figure 10:
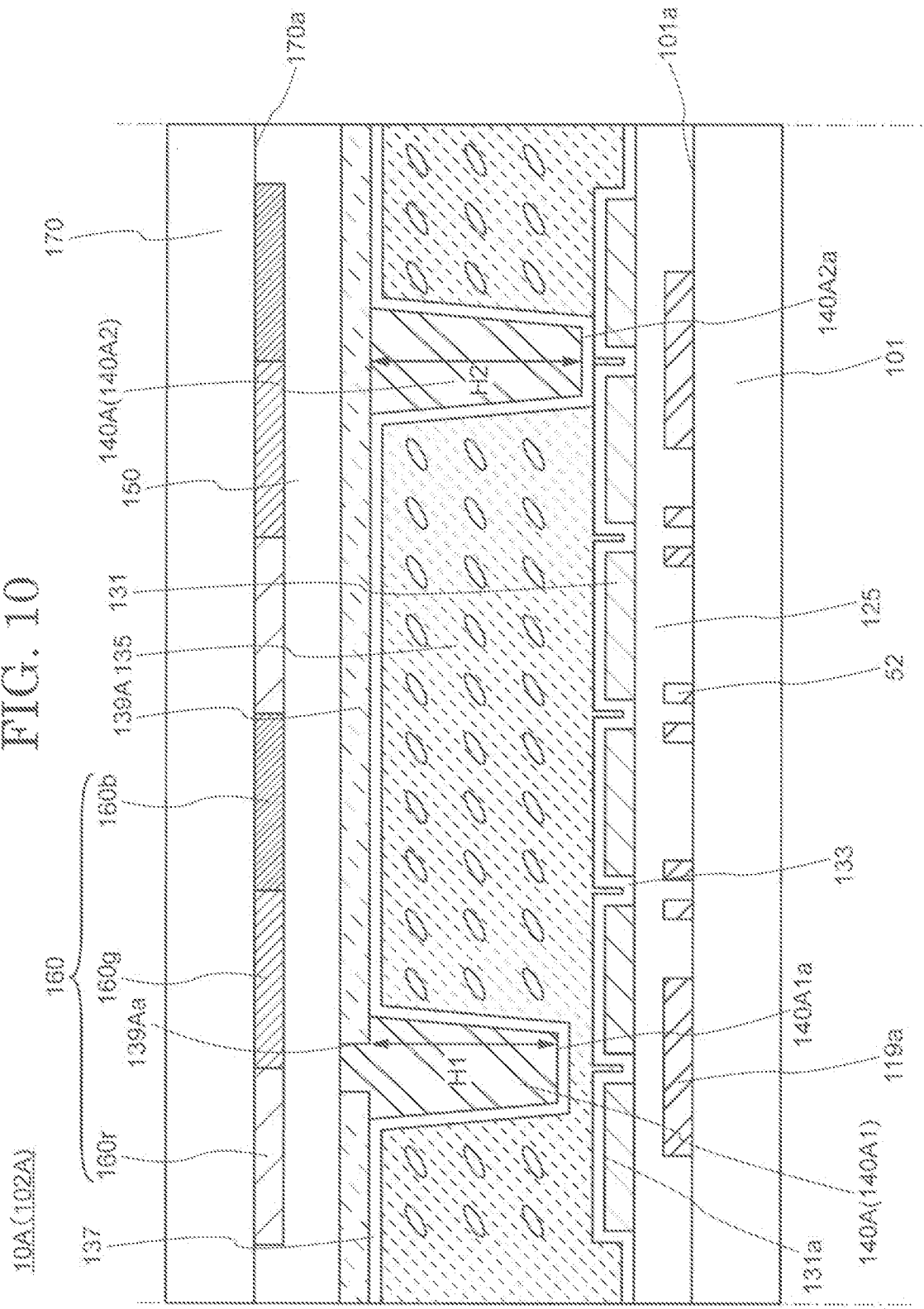
FIG. 10 is a cross-sectional view showing a display region in a display device according to an embodiment of the present invention.

FIG. 10 is an enlarged cross-sectional schematic view of a part of a display region 102A in a display device 10A. In FIG. 10, a part of the configuration is omitted for the sake of explanation. A detailed cross-sectional configuration will be described later.

As shown in FIG. 10, the display device 10A includes a spacer 140A in addition to the substrate 101, the light-shielding layer 119a, the alignment film 133, the liquid crystal display element 130 (the pixel electrode 131, the liquid crystal layer 135, a common electrode 139A), the alignment film 137, the planarization insulating layer 150, the color filter 160, and the substrate 170.

The spacer 140A includes a sub-spacer 140A1 (also referred to as a first spacer) and a main spacer 140A2 (also referred to as a second spacer). The sub-spacers 140A1 and the main spacer 140A2 are formed of the same material as the spacer 140. Unlike the first embodiment, in this embodiment, the spacer 140A does not have to be provided corresponding to an opening 139Aa of a common electrode 139A. Specifically, the sub-spacer 140A1 is provided corresponding to the opening 139Aa. The main spacer 140A2 is arranged without corresponding to the opening 139Aa. A light-shielding layer (a first light-shielding layer 119a1) similar to that of the first embodiment is provided at a position facing the sub-spacer 140A1. However, a light-shielding portion (a second light shielding portion 119a2) is also provided at a position facing the main spacer 140A2. Also in this embodiment, the arrangement of the light-shielding layer is the same as that shown in FIG. 4. That is, shapes of the first light-shielding layer 119a1 and the second light-shielding layer 119a2 in a plan view are the same. Of course, a configuration in which the sizes of the respective light-shielding layers are changed in accordance with the sizes of the sub-spacer 140A1 and the main spacer 140A2 in a plan view can also be used. Similar to the first embodiment, the first light-shielding layer 119a1 and the second light-shielding layer 119a2 are provided on the same layer as any one of the gate electrode 111, the source/drain electrode 119b, the signal line 52 connected to the transistor, and the relay wiring connected to the pixel electrode 131.

In this embodiment, the sub-spacer 140A1 contacts the planarization insulating layer 150 via the opening 139Aa. In this case, the sub-spacer 140A1 is separated from the pixel electrode 131. Specifically, the alignment film 137 provided on a tip portion 140A1a of the sub-spacer 140A1 is separated from the alignment film 133 provided on a top surface 131a of the pixel electrode 131. On the other hand, the main spacer 140A2 contacts a portion of the pixel electrodes 131 arranged adjacent to each other. Specifically, the alignment film 137 provided on a tip portion 140A2a of the main spacer 140A2 contacts the alignment film 133 provided on the top surface 131a of the pixel electrode 131. Therefore, as shown in FIG. 10, a height H1 (also referred to as a first height) of the sub-spacer 140A1 between the pixel electrode 131 and the common electrode 139 is smaller than a height H2 (also referred to as a second height) of the main spacer 140A2 between the pixel electrode 131 and the common electrode 139. Since the main spacer 140A2 is in constant contact with the pixel electrode 131, it can be referred to as a grounding pillar. On the other hand, the sub-spacer 140A1 is normally separated from the pixel electrode 131. However, when a physical shock is applied from the substrate 170 side, the sub-spacer 140A1 contacts the pixel electrode 131. Therefore, the sub-spacer 140A1 can be referred to as a floating pillar.

Figure 11:
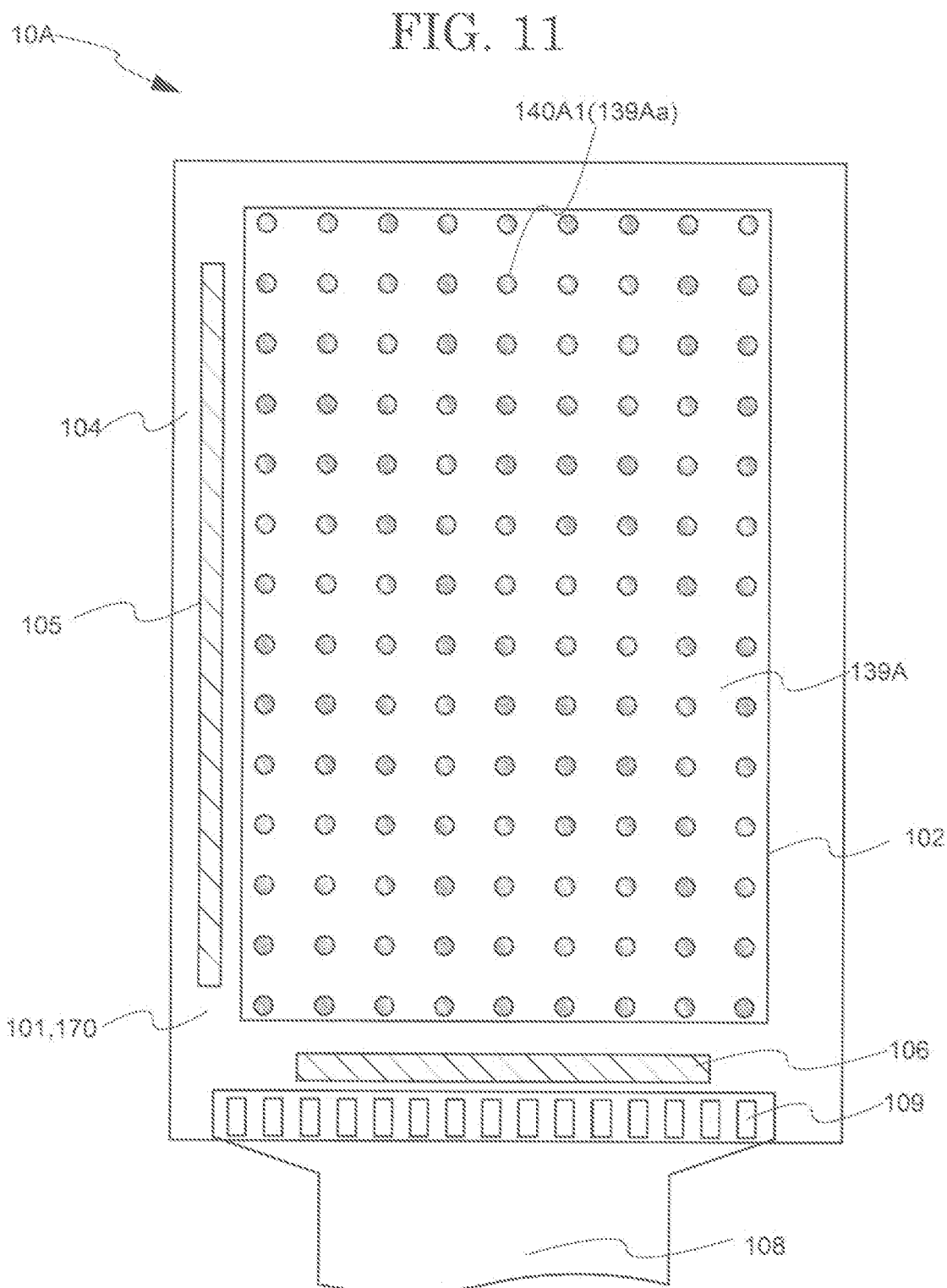
FIG. 11 is a top view showing a display device according to an embodiment of the present invention.

FIG. 11 is a schematic diagram showing the display device 10A. As shown in FIG. 11, the sub-spacer 140A1 and the opening 139Aa may be uniformly arranged on the display region 102 together with the main spacer 140A2 in the display device 10A. In this case, the number of the main spacers 140A2 arranged per unit area (arrangement density) may be smaller than the arrangement density of the sub-spacer 140A1. For example, the arrangement density of the main spacer 140A2 may be 67% or less of the arrangement density of the sub-spacer 140A1. The arrangement density of the main spacer 140A2 may be 10% or less, or 1% or less, or 0.1% or more and 0.5% or less with respect to the area of the display region. In FIG. 11, the main spacer 140A2 is not shown (the same applies to FIGS. 12 and 14).

In this embodiment, by providing the sub spacer 140A1, the effect of the physical shock is mitigated. That is, by using the display device of this embodiment, the impact resistance can be enhanced.

Third Embodiment

In this embodiment, a display device different from the second embodiment will be described. Specifically, an example in which the arrangement density of the sub-pixel is different within the display region will be described.

Figure 12:
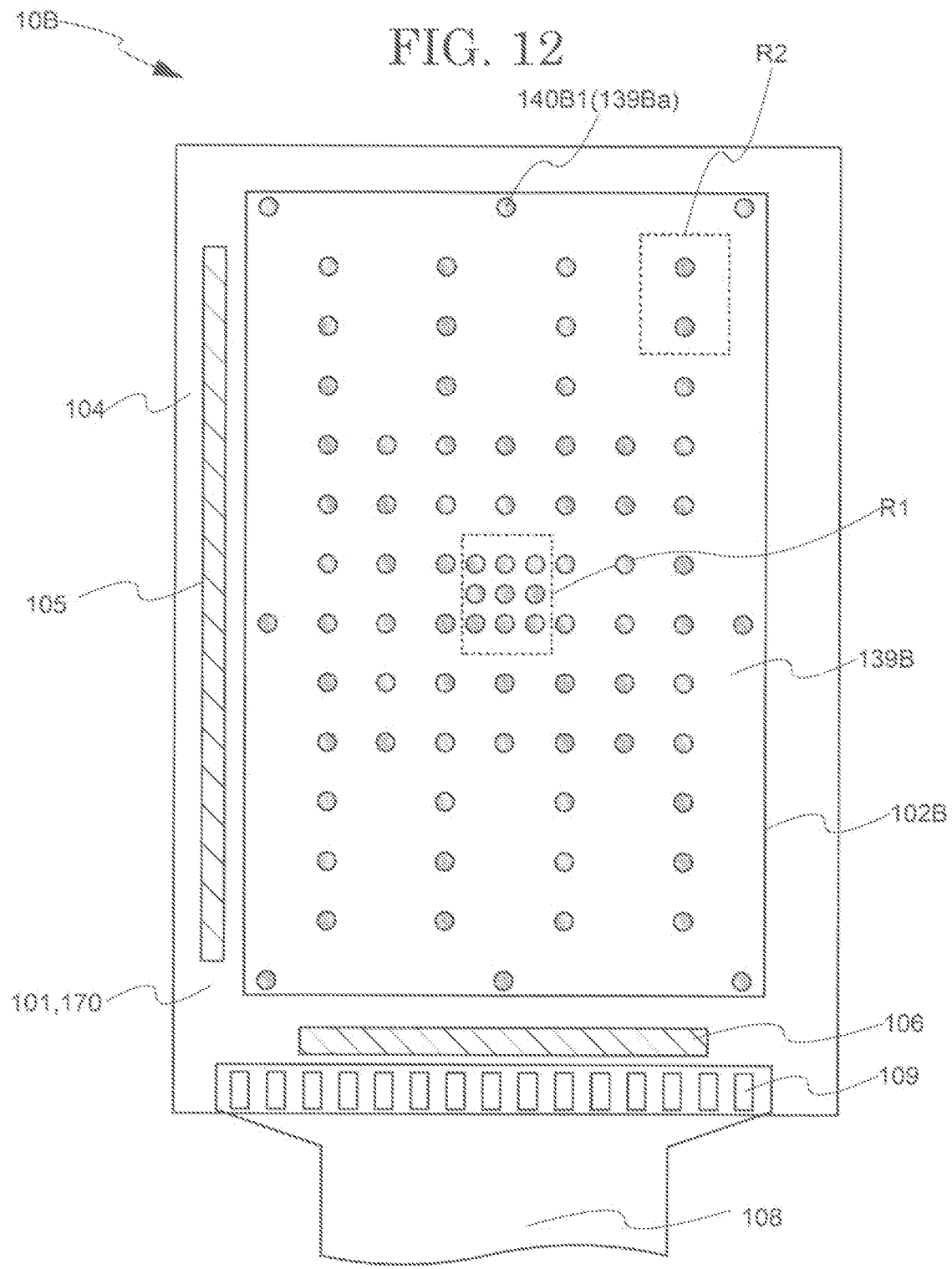
FIG. 12 is a top view showing a display device according to an embodiment of the present invention.

FIG. 12 is a schematic diagram of a display device 10B. In FIG. 12, in particular, the arrangement density of a sub-spacer 140B1 (an opening 139Ba of a common electrode 139B) in a display region 102B will be described. In the display device 10B, there may be more residual gases in the planarization insulating layer 150 or the color filter 160 at a center portion R1 of the display region 102B. Therefore, as shown in FIG. 12, in the display device 10B, it is desirable that the number of the openings $N_{R1}$ per unit area provided in the center portion R1 of the display region 102B and the number of the openings $N_{R2}$ per unit area provided in a peripheral region R2 of the display region 102B are different from each other. In other words, the arrangement density of the sub-spacer 140B1 (the opening 139Ba) is preferably higher from the peripheral region R2 of the display region 102B to the central portion R1. As a result, the gas accumulated during the manufacture of the display device can be effectively degassed. The central portion R1 of the display region 102B is particularly a portion from which the gas is difficult to vent. However, the degassing in the manufacturing process can be performed more effectively by arranging the opening 139Ba as described above. As a result, it is possible to suppress the generation of a display defect after the display device 10B is completed.

Fourth Embodiment

In the second embodiment of the present invention, an example in which the sub-spacer 140A1 is provided corresponding to the opening 139a has been described. However, the present invention is not limited thereto. In this embodiment, an example in which sub-spacers have different structures will be described.

Figure 13:
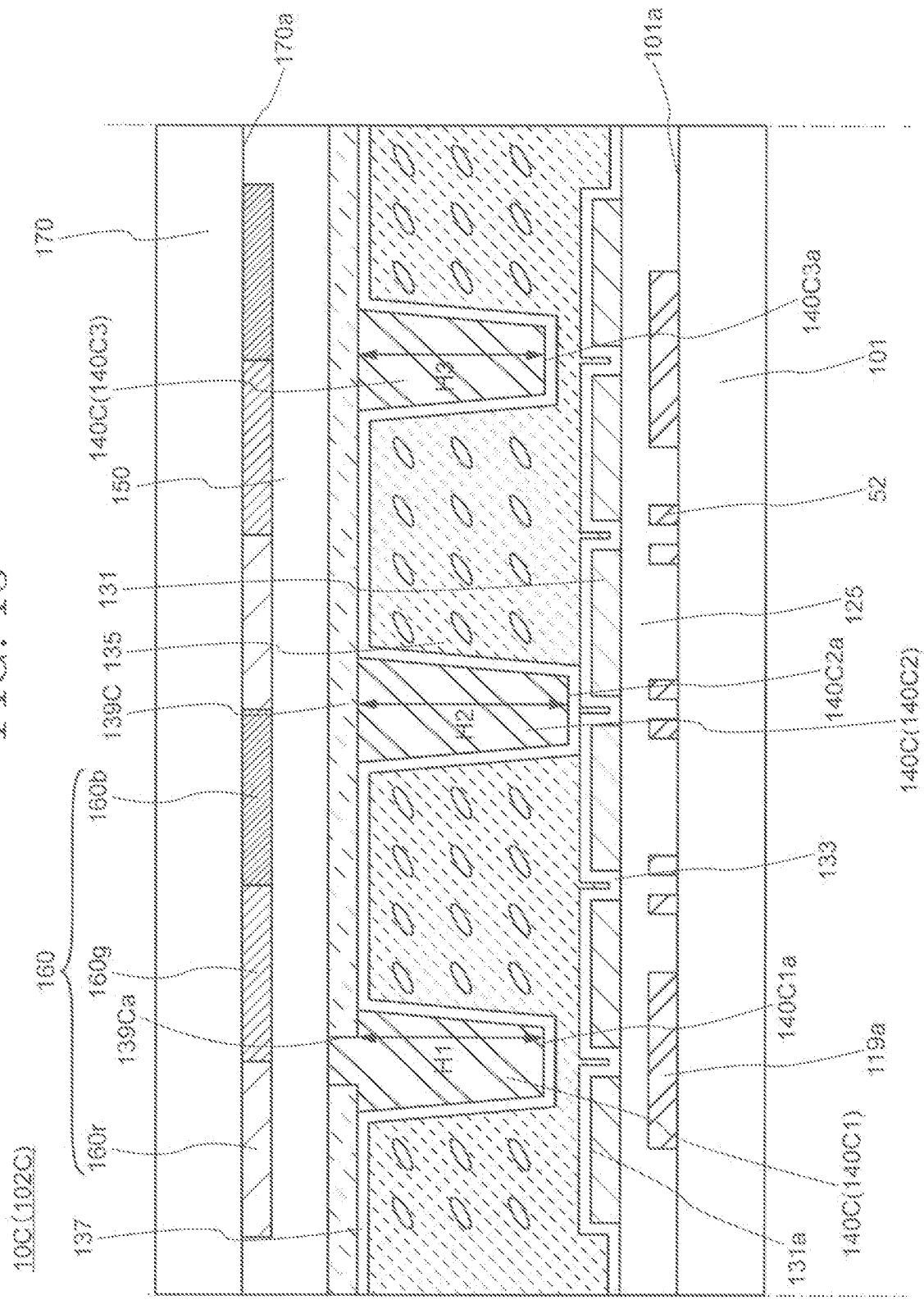
FIG. 13 is a cross-sectional view showing a display region in a display device according to an embodiment of the present invention.

FIG. 13 is a schematic cross-sectional view showing an enlarged part of a display region 102C of a display device 100. As shown in FIG. 13, a spacer 140C includes a sub-spacer 140C1 and a sub-spacer 140C3 together with a main spacer 140C2. The sub-spacer 140C1 may be provided corresponding to an opening 139Ca of a common electrode 139C. The main spacer 140C2 and the sub-spacer 140C3 may be arranged without corresponding to the opening 139Ca of the common electrode 139C.

The main spacer 140C2 contacts the pixel electrode 131. Specifically, the alignment film 137 provided on a tip portion 140C2a of the main spacer 140C2 contacts the alignment film 133 provided on the top surface 131a of the pixel electrode 131.

The sub-spacer 140C1 contacts the planarization insulating layer 150 via the opening 139Ca. On the other hand, the sub-spacer 140C1 is separated from the pixel electrode 131. Specifically, the alignment film 137 provided on a tip portion 140C1a of the sub-spacer 140C1 is separated from the alignment film 133 provided on the top surface 131a of the pixel electrode 131. Similarly, the sub-spacer 140C3 is separated from the pixel electrode 131. Specifically, the alignment film 137 provided on a tip portion 140C3a of the sub-spacer 140C3 is separated from the alignment film 133 provided on the top surface 131a of the pixel electrode 131. In this case, as shown in FIG. 13, the height H1 of the sub-spacer 140C1 between the pixel electrode 131 and the common electrode 139 is smaller than the height H2 of the main spacer 140C2 and is substantially the same as the height H3 (also referred to as the third height) of the sub-spacer 140C3 between the pixel electrode 131 and the common electrode 139.

In this embodiment, the main spacer 140C2, the sub-spacer 140C1, and the sub-spacer 140C3 may be simultaneously formed by a photolithography method. In this case, the sub-spacer 140C3 may be formed using a halftone mask.

Figure 14:
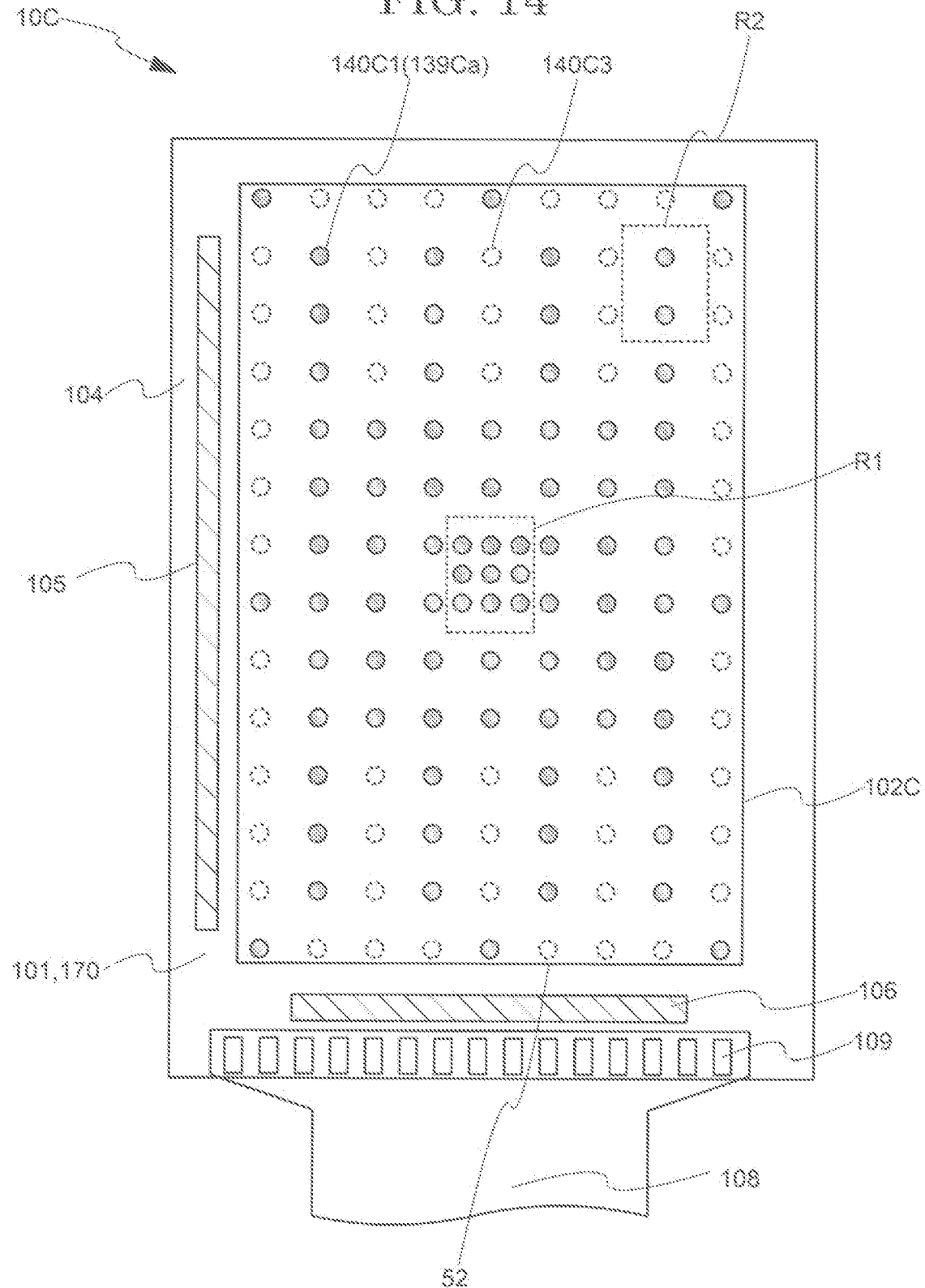
FIG. 14 is a top view showing a display device according to an embodiment of the present invention.

FIG. 14 is a schematic diagram showing the arrangement of the sub-spacer in the display device 100. As shown in FIG. 14, the entire sub-spacer including the sub-spacer 140C1 and the sub-spacer 140C3 may be uniformly arranged on the display region 102 together with the main spacer 140C2. In this case, the arrangement density of the sub-spacer 140C1 (the opening 139Ca) may be higher from the peripheral region R2 to the central portion R1 of the display region 102 as in the third embodiment. The degassing in the manufacturing process can be performed more effectively by arranging the opening 139Ca as described above. As a result, it is possible to suppress the generation of a display defect after the display device 10C is completed.

Fifth Embodiment

In the second embodiment of the present invention, an example in which the height of the sub-spacer and the height of the main spacer are different from each other has been described. However, the present invention is not limited thereto. In this embodiment, an example in which the pixel electrode that overlaps the sub-spacer not corresponding to the opening is different will be described.

Figure 15:
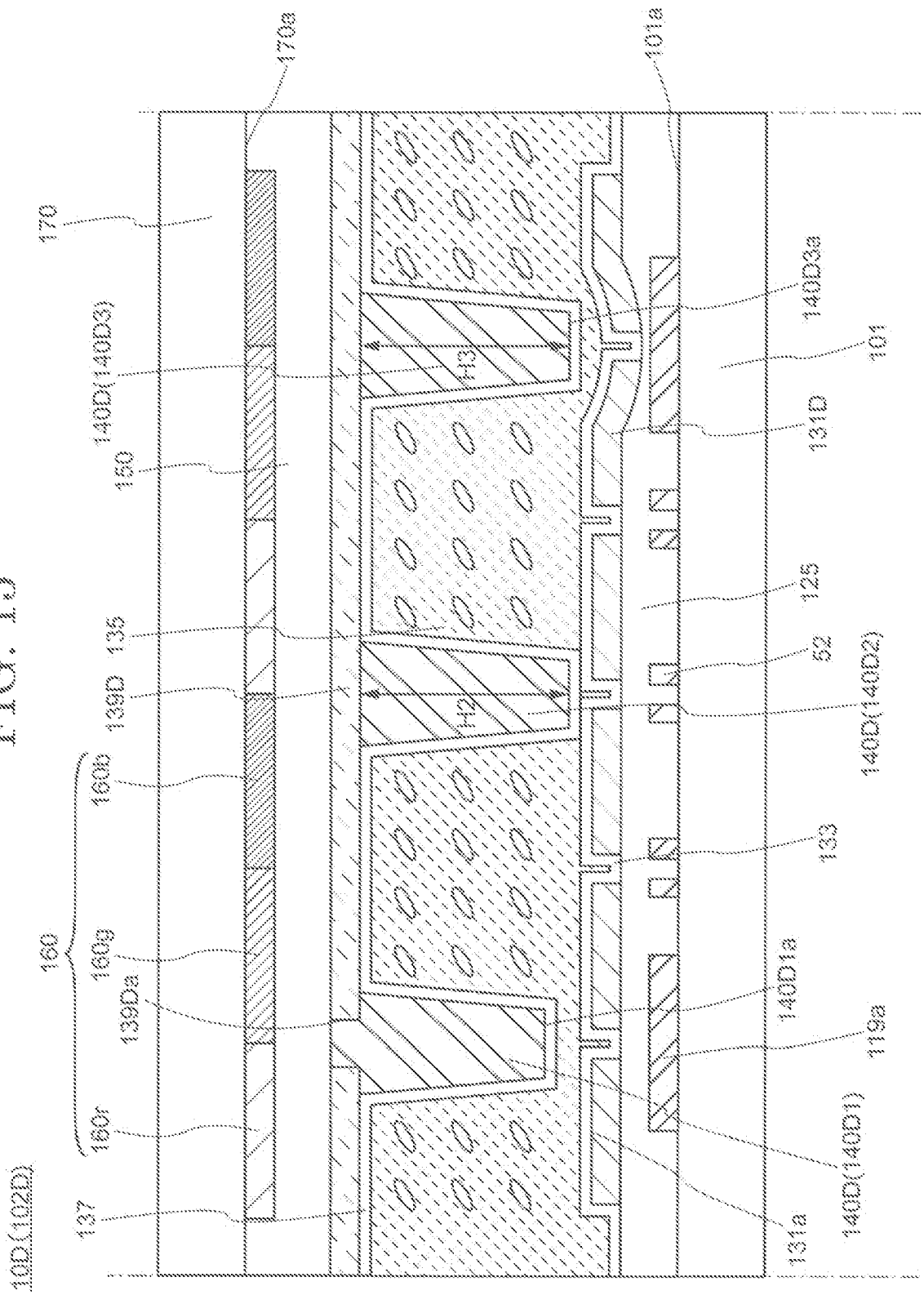
FIG. 15 is a cross-sectional view showing a display region in a display device according to an embodiment of the present invention.

FIG. 15 is a schematic cross-sectional view showing an enlarged part of a display region 102D of a display device 10D. As shown in FIG. 15, the spacer 140D includes a sub-spacer 140D1 and a sub-spacer 140D3 together with a main spacer 140D2. The sub-spacer 140D1 may be provided corresponding to an opening 139Da of a common electrode 139D. The sub-spacer 140C3 may be arranged without corresponding to the opening 139Da of the common electrode 139D.

The main spacer 140D2 contacts the pixel electrode 131. Specifically, the alignment film 137 provided on a tip portion 140D2a of the main spacer 140D2 contacts the alignment film 133 provided on the top surface 131a of the pixel electrode 131.

The sub-spacer 140D1 contacts the planarization insulating layer 150 via the opening 139Da. The sub-spacer 140D1 is separated from the pixel electrode 131. Specifically, the alignment film 137 provided on a tip portion 140D1a of the sub-spacer 140D1 is separated from the alignment film 133 provided on the top surface 131a of the pixel electrode 131.

The sub-spacer 140D3 is separated from the pixel electrode 131. Specifically, the alignment film 137 provided on the tip portion 140D3a of the sub-spacer 140D3 is separated from the alignment film 133 provided on the top surface 131a of the pixel electrode 131. In this case, the portion corresponding to the sub-spacer 140D3 of the planarization insulating layer 125 may have a recess. Thus, the pixel electrode 131 is arranged according to the shape of the planarization insulating layer 121.

As shown in FIG. 15, the height H3 of the sub-spacer 140D3 between the top surface of the pixel electrode 131 and the top surface of the common electrode 139 is substantially the same as the height H2 of the main spacer 140D2 between the top surface of the pixel electrode 131 and the top surface of the common electrode 139.

The main spacer 140D2, the sub-spacer 140D1, and the sub-spacer 140D3 may be formed simultaneously by a photolithography method.

The sub-spacer 140D3 may be uniformly arranged on the display region together with the main spacer 140D2. In this case, the arrangement density of the sub-spacer 140D1 (the opening 139a) may be higher from the peripheral region to the center portion of the display region 102 as in the fourth embodiment.

Modification

Within the spirit of the present invention, it is understood that various changes and modifications can be made by those skilled in the art and that these modifications and modifications also fall within the scope of the present invention. For example, as long as the gist of the present disclosure is provided, deletions, or changes to the design of components or additions, omissions, or changes to the conditions of processes to each of the above-described embodiments by a person skilled in the art are included in the scope of the present invention.

Figure 16:
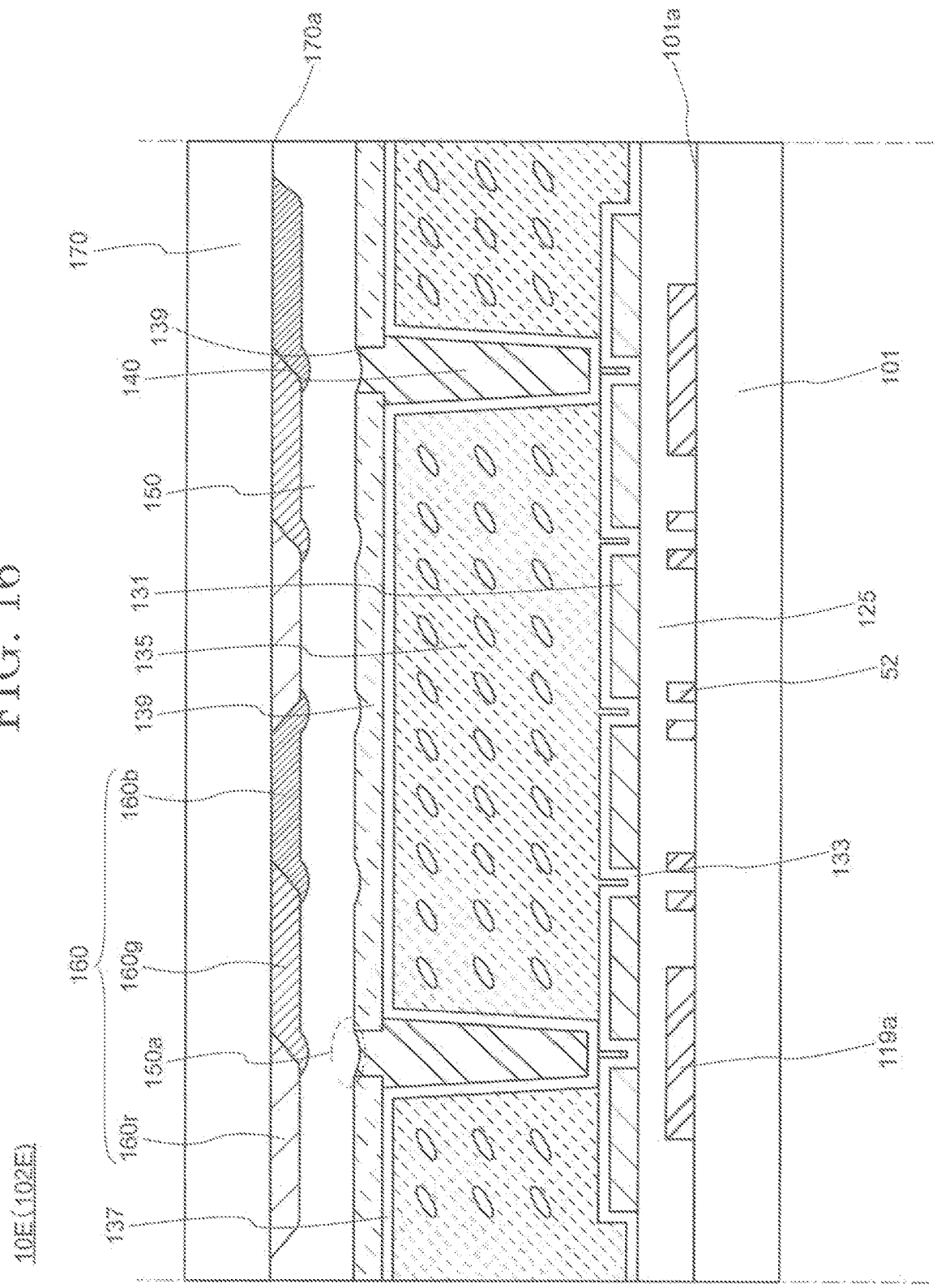
FIG. 16 is a cross-sectional view showing a display region in a display device according to an embodiment of the present invention.

In the first embodiment of the present invention, the top surface of the planarization insulating layer 150 is flat. However, the present invention is not limited thereto. FIG. 16 is a schematic cross-sectional view showing an enlarged part of a display region 102E of a display device 10E. For example, as shown in FIG. 16, a part 150a of the planarization insulating layer 150 that contacts the spacer 140 may have a convex part. For example, end portions of the color filters overlap. Consequently, the planarization insulating layer 150 partially swells. This widens the contact area between the spacer 140 and the planarization insulating layer 150. Consequently, the adhesion between the spacer 140 and the planarization insulating layer 150 can be further improved.

In the first embodiment of the present invention, the light-shielding layer 119a is provided in the same layer as the source/drain electrode 119b. However, the present invention is not limited thereto. For example, the light-shielding layer 119a may be provided in the same layer as the gate electrode 111 (or the scan line 51), or may be provided in the same layer as the conductive layer 123 functioning as the relay wiring.

In the first embodiment of the present invention, an example in which the color filter is used has been described. However, the present invention is not limited thereto. An embodiment of the present invention is also applicable to a structure without a color filter (a monochrome display structure).

What is claimed is:

1. A display device comprising:
a plurality of pixel electrodes arranged in a display region of a first substrate;
a color filter provided on a second substrate opposing the first substrate and overlapping the pixel electrode;
a planarization insulating layer provided on the color filter;
a common electrode provided on the planarization insulating layer and having an opening;
a first spacer arranged between the pixel electrode and the common electrode and overlapping the opening;
a first light-shielding layer provided between the first substrate and the pixel electrode and overlapping the first spacer; and
a second spacer arranged between the pixel electrode and the common electrode and not overlapping the opening, wherein
a first width of the opening is smaller than a second width of the first spacer,
the first width is a width of the opening in a direction parallel to a main surface of the second substrate in a cross-sectional view,
the second width is a width of a common electrode side of the first spacer in a direction parallel to a main surface of the second substrate in the cross-sectional view,
the first spacer has an outer edge that overlaps the common electrode, and
a number of second spacers per unit area provided in a center of the display region is different from a number of second spacers per unit area provided in a peripheral area of the display region.

2. The display device according to claim 1, wherein the opening overlaps a boundary region of each color filter.

3. The display device according to claim 1, wherein the first spacer overlaps a part of at least two pixel electrodes arranged adjacent to each other among the plurality of pixel electrodes.

4. The display device according to claim 1, wherein a number of openings per unit area provided at the center of the display region is different from a number of openings per unit area provided at the periphery of the display region.

5. The display device according to claim 1, wherein the first spacer is in contact with the planarization insulating layer through the opening.

6. The display device according to claim 1, wherein a shape of the first light-shielding layer in a plan view is larger than a shape of the first spacer.

7. The display device according to claim 1, wherein the first light-shielding layer is provided on the same layer as any of a gate electrode, a source/drain electrode of a transistor provided on the first substrate, a signal line connected to the transistor, and relay wiring connected to the pixel electrode.

8. The display device according to claim 7, wherein the first light-shielding layer is formed together with the signal line, and
a portion corresponding to the first light-shielding layer in the signal line is formed to bulge outward.

9. The display device according to claim 1, wherein a first height of the first spacer is smaller than a second height of the second spacer between the pixel electrode and the common electrode.

10. The display device according to claim 9, further comprising:
a second light-shielding layer provided between the first substrate and the pixel electrode, the second light-shielding layer overlapping the second spacer.

11. The display device according to claim 10, wherein a shape of the second light-shielding layer in a plan view is larger than a shape of the second spacer.

12. The display device according to claim 10, wherein the first light-shielding layer and the second light-shielding layer have the same shape in a plan view.

13. The display device according to claim 10, wherein
the first light-shielding layer and the second light-shieling layer are provided on the same layer as any of a gate electrode, a source/drain electrode of a transistor provided on the first substrate, a signal line connected to the transistor, and relay wiring connected to the pixel electrode.

14. The display device according to claim 13, wherein
the first light-shielding layer and the second light-shielding layer are formed together with the signal line, and
a portion corresponding to the first light-shielding layer in the signal line is formed to bulge outward.

* * * * *